United States Patent
Tymon et al.

(10) Patent No.: US 11,091,860 B1
(45) Date of Patent: Aug. 17, 2021

(54) HIGH-STRENGTH AND TEAR-RESISTANT LEATHER MATERIALS AND METHODS OF MANUFACTURE

(71) Applicant: Sustainable Composites, LLC, Lancaster, PA (US)

(72) Inventors: Thomas M. Tymon, Lancaster, PA (US); Franklin L. Fox, Lancaster, PA (US); Hudson T. Van Ormer, Lancaster, PA (US)

(73) Assignee: Sustainable Composites, LLC, Lancaster, PA (US)

( * ) Notice: Subject to any disclaimer, the term of this patent is extended or adjusted under 35 U.S.C. 154(b) by 0 days.

(21) Appl. No.: 16/802,117

(22) Filed: Feb. 26, 2020

Related U.S. Application Data

(63) Continuation-in-part of application No. 16/186,757, filed on Nov. 12, 2018, now Pat. No. 10,577,670, which is a continuation-in-part of application No. 15/400,906, filed on Jan. 6, 2017, now Pat. No. 10,131,096, and a continuation-in-part of application No. 15/400,913, filed on Jan. 6, 2017, now Pat. No. 10,138,595, and a continuation-in-part of application No. 15/400,923, filed on Jan. 6, 2017, now Pat. No. 10,124,543.

(60) Provisional application No. 62/717,953, filed on Aug. 13, 2018, provisional application No. 62/275,485, filed on Jan. 6, 2016, provisional application No. 62/275,503, filed on Jan. 6, 2016, provisional application No. 62/275,512, filed on Jan. 6, 2016.

(51) Int. Cl.
*D04H 1/4266* (2012.01)
*D01B 9/00* (2006.01)
*D04H 1/72* (2012.01)
*C08L 89/06* (2006.01)
*C14B 7/04* (2006.01)

(52) U.S. Cl.
CPC ........... *D04H 1/4266* (2013.01); *C08L 89/06* (2013.01); *C14B 7/04* (2013.01); *D01B 9/00* (2013.01); *D04H 1/72* (2013.01)

(58) Field of Classification Search
None
See application file for complete search history.

(56) References Cited

U.S. PATENT DOCUMENTS

| | | | | |
|---|---|---|---|---|
| 2,040,511 | A | * | 5/1936 | Bleyenheuft ........ D06N 3/0061 8/495 |
| 2,148,904 | A | * | 2/1939 | Horowitz ................ C08L 89/06 106/124.61 |
| 2,148,905 | A | * | 2/1939 | Horowitz ................ C08L 89/06 106/124.61 |
| 2,158,265 | A | * | 5/1939 | Wilson .................... C08L 89/06 162/151 |
| 2,237,235 | A | * | 4/1941 | Lynam .................... C08L 89/06 162/135 |
| 2,464,282 | A | * | 3/1949 | Abrahams ............... C08L 89/06 524/79 |
| 2,601,671 | A | * | 6/1952 | Wilson ....................... C08J 5/06 162/151 |
| 3,116,200 | A | * | 12/1963 | Young ..................... C08L 89/06 162/151 |

(Continued)

*Primary Examiner* — Mary Lynn F Theisen
(74) *Attorney, Agent, or Firm* — Hooker & Habib, P.C.

(57) ABSTRACT

A leather substrate formed from waste leather and its method of production, particularly a leather substrate made up substantially of a collagen fibril matrix.

38 Claims, 7 Drawing Sheets

(56) References Cited

U.S. PATENT DOCUMENTS

| | | | | |
|---|---|---|---|---|
| 3,136,682 | A * | 6/1964 | Tu | C08L 89/06 |
| | | | | 162/151 |
| 3,179,342 | A * | 4/1965 | Young | D21H 5/1209 |
| | | | | 241/4 |
| 3,436,303 | A * | 4/1969 | Fraser | D21H 27/30 |
| | | | | 162/123 |
| 3,505,169 | A * | 4/1970 | Parker | C08L 75/04 |
| | | | | 162/151 |
| 3,542,705 | A * | 11/1970 | Mason | C08F 236/12 |
| | | | | 524/11 |
| 3,607,609 | A * | 9/1971 | Bogdanovicz | D04H 1/4291 |
| | | | | 442/152 |
| 4,497,871 | A * | 2/1985 | Henke | B29B 17/0026 |
| | | | | 428/473 |
| 4,520,058 | A * | 5/1985 | Okabe | C08L 89/06 |
| | | | | 427/206 |
| 4,536,430 | A * | 8/1985 | Krecke | C08L 89/06 |
| | | | | 106/124.6 |
| 4,834,762 | A * | 5/1989 | Nishibori | C08J 3/12 |
| | | | | 8/94.1 R |
| 5,272,190 | A * | 12/1993 | Kai | C08L 7/00 |
| | | | | 524/11 |
| 6,264,879 | B1 * | 7/2001 | Addie | B29C 70/502 |
| | | | | 264/115 |
| 9,181,404 | B2 * | 11/2015 | Neresini | C08L 89/06 |
| 10,124,543 | B1 * | 11/2018 | Tymon | B29C 70/345 |
| 10,131,096 | B1 * | 11/2018 | Tymon | C08L 89/06 |
| 10,138,595 | B1 * | 11/2018 | Tymon | D06N 3/042 |
| 10,577,670 | B1 * | 3/2020 | Tymon | D06N 3/0018 |
| 2015/0292148 | A1 * | 10/2015 | Pourdeyhimi | D06B 1/00 |
| | | | | 442/402 |

\* cited by examiner

HIGH-STRENGTH AND TEAR-RESISTANT LEATHER MATERIALS AND METHODS OF MANUFACTURE

RELATED APPLICATION

This application claims the benefit of U.S. patent application Ser. No. 16/186,757 for "High-Strength and Tear-Resistant Leather Materials and Methods of Manufacture" filed Nov. 12, 2018, now U.S. Pat. No. 10,577,670, which is a continuation of prior U.S. patent application Ser. No. 15/400,906 for "High Strength Leather Material" filed Jan. 6, 2017 now U.S. Pat. No. 10,131,096; prior U.S. patent application Ser. No. 15/400,913 for "Dispersion Processing Aids for the Formation of a Leather Material" filed Jan. 6, 2017 now U.S. Pat. No. 10,138,595; prior U.S. patent application Ser. No. 15/400,923 for "High Strength Leather Material" filed Jan. 6, 2017 now U.S. Pat. No. 10,124,543; and prior U.S. Patent Application No. 62/717,953 for "High Strength and Tear Resistant Leather Material and Method of Manufacture" filed Aug. 13, 2018, which priority applications are incorporated by reference as if fully set forth herein.

FIELD OF THE DISCLOSURE

This disclosure relates to formed leather products and their method of manufacture. Particularly, the disclosure relates to a leather substrate material formed from waste leather having improved strength and tear-resistance characteristics. De-wetting and dispersion aids that assist in de-wetting steps to remove desired amounts of moisture from interim wet lap products are described. The interim wet lap products realize improved fiber and fibril dispersion which results in improved formation and resultant physical properties in formed leather substrates.

The disclosure further relates to the formation of a composite leather substrate formed from multiple leather substrates having different compositions. Creation of a composite leather substrate from two or more component sheets of leather material allows for the use of source scrap leather that would otherwise be undesirable in a finished leather product.

BACKGROUND OF THE DISCLOSURE

Conventional leather is formed by tanning animal hides. The tanning process treats an animal hide with a variety of substances to improve and maintain leather's desirable physical characteristics for use in clothing, upholstery, luggage and like applications. The most desirable physical characteristics of tanned leather include appearance, feel, resilience to stretching, longevity, treatability with a variety of surface conditioning finishes and natural drape.

Leather's desirable characteristics are attributed in part to it being a fibrous, semi-porous material made up of an entangled, open matrix of resistant collagen fibers. Collagen fibers make up the majority of leather's composition. Collagen fibers are made up of constituent collagen fibril bundles made up in turn by smaller elongated strands of collagen protein known as collagen fibrils.

Generally, the tanning process is directed toward collagen fibers to fix chemically reactive sites on collagen fibers and to increase intramolecular salt links between adjacent collagen molecules. This links the matrix of resistant collagen fiber bundles, leaving tanned leather pliable, and occupies reactive sites that otherwise would allow leather to degrade and rot. The tanning process likewise removes other compounds from the hide that may be susceptible to degradation and/or perform other functions in the hide. Such compounds may be replaced with other materials.

Obtaining natural leather is problematic due to supply hide having varying qualities, tanning process costs, varying hide costs over time and other challenges.

The leather harvesting, tanning and preparation process produces waste leather byproducts in leather scraps and shavings. If not otherwise used, the waste leather is disposed of by landfill or incineration, creating a negative environmental impact.

Artificial leather products containing waste leather, such as bonded leather, attempt to emulate natural leather. Bonded leather is synthetic leather formed by embedding shredded leather particles into various binding materials. The shredded leather and binding material substance may be applied onto a fabric backing carrier.

Bonded leather type synthetic leathers lack the above-noted desirable characteristics of natural leather. This is due to synthetic leathers lacking the continuous matrix of resistant collagen fiber bundles found in natural leather.

The failure of known artificial and synthetic leathers that contain shredded leather particles is that the individual particles do not physically interact to reproduce or emulate the characteristics of a continuous piece of natural leather having an entangled matrix of resistant collagen fibers. Most notably, artificial and synthetic leathers suffer as lacking desirable tear resistance, drape, flexibility and other esthetic attributes.

In tests applied by a conventional tensometer, artificial and synthetic leather samples of 0.010 to 0.080 inch thickness were subjected to pulling stresses under tension to failure. Measurement of maximum applied force before failure was recorded and calculated as maximum tensile strength PSI measurements ranging generally from about 790 PSI to about 1750 PSI.

Likewise, given the inherently variable makeup of organic animal hides and tanning treatments, the tensile strength qualities of tanned natural leather can vary widely. The tensile strength of representative natural tanned leathers have been found to vary from about 2000 to 3200 PSI depending on leather quality, mechanical treatments and coatings applied to the leather.

Processes for forming other types of formed leather substrates containing shredded and fibrillated collagen leather fibers derived from waste derived leather are known. A challenge with these processes is the inability to achieve acceptable levels of fibril dispersion so that subsequently formed leather substrates have the potential for fibril-to-fibril entanglement.

Another challenge is that wet lap products that are formed mid-process are difficult to dewater and represent a limit to the degree of fibril dispersion which can be achieved in a final leather substrate product. Wet lap may refer to a sheet containing the dispersed fibrils, where particles or fibers are suspended in a fluid (such as a slurry), and the wet lap may be pressed or otherwise manipulated to eliminate or remove at least a portion of that fluid.

The interim wet lap products of these processes also tend to have low wet lap strengths. This presents processing challenges with manipulating interim wet lap products in large-scale production processes using known paper-type processing machines. During transition of the interim wet lap from wire mesh sections of paper-type processing machines, the wet lap tends to break reducing process efficiency and making it very difficult or impossible to produce the end product on a large scale.

Another challenge with prior art processes for forming leather substrates is that required leather particles must be shredded or ground to small sizes and passed through screens having likewise small apertures of approximately 3/32 (0.09375) of an inch in diameter in order to attain desired fibril dispersion and interaction between leather particles. These small grind sizes can slow processing times which reduce process productivity and also limits the ability to achieve some desired physical properties.

Yet another challenge with known processes for forming leather substrates derived from waste leather is the inability to obtain an end product having desired qualities in the outer, presentation surface of an end leather product.

Waste leather that is used in methods of producing a leather substrate may be obtained from different sources including strip waste, cuttings and scraps from the processing of source leather of various grades. Source waste leather may be higher quality full grain or top grain leather obtained from surface or top cuts of animal hide. Alternatively, source waste leather may be lower quality split grain or genuine leather obtained from inner split or bottom cuts of animal hide.

Generally, source waste leather obtained from the surface of animal hide contains leather fibers which provide higher strength and tear-resistance qualities over source leather obtained from the inner portions of animal hide. However, source waste leather derived from full grain or top grain leather often contains the residue of protective coatings and other processing agents which can interfere with the steps of properly processing leather particles, resulting in lumps or non-uniform formation of interim wet lap products as well as lumps on the surface of formed leather substrates. These imperfections can limit the use of source waste leather derived from full grain or top grain leather for the disclosed method.

Thus, there is a need for an improved formed leather product that is created from available waste leather byproducts that reproduces desirable physical characteristics of natural leather. The improved leather product should emulate the collagen fiber matrix that is found in natural leather, have predictable physical characteristics including high tear resistance, desired elastic properties for a range of end applications, and treatability by conventional leather conditioning substances. The process of creating the improved leather product should allow improved de-watering of interim wet lap products and have good wet lap strength to facilitate physically manipulating interim wet lap products. The improved leather product should also have desired qualities in its outer, presentation surface.

SUMMARY OF THE DISCLOSURE

Disclosed is a formed leather material created from commonly available waste leather byproducts and its method of manufacture. The formed leather material reliably reproduces desirable physical characteristics of natural leather, including high tear resistance, high tensile strength, desired elastic properties for end applications and treatability by conventional leather conditioning substances.

The improved leather material includes a formed leather substrate containing a matrix formed by collagen fibrils. The collagen fibril matrix is formed from entangled collagen fibrils derived from collagen fibril bundles and collagen fibers found in naturally occurring leather.

The formed leather substrate is formed by obtaining leather waste and physically processing the waste by shredding or grinding to create leather particles of desired size. The leather particles are combined with water to form a particle/water mixture. The mixture is processed to allow collagen fibril bundles within the particles to absorb a quantity of water. The water absorption swells and partially distresses the collagen fibril bundles. The partially distressed bundles are particularly susceptible to mechanical dispersion. Appropriate treatment of mechanical dispersion of the swollen, partially distressed fibril bundles extracts a high yield of constituent collagen fibrils from the bundles to the particle/water mixture. Water is then removed from the mixture through a series of de-watering steps to form a leather substrate product containing a matrix of collagen fibrils, bundles and fibers.

In embodiments, the formed leather substrate may be formed by the treatment of leather waste to obtain appropriately partially distressed collagen fibril bundles which are additionally treated to form a desirable leather substrate product.

In disclosed process steps, the particle/water mixture is treated with various materials to facilitate manufacturing steps and the formation of a leather substrate having desired physical properties.

In particular, disclosed are process steps including the use of specific de-wetting and dispersion aids. These aids assist in the formation of interim wet lap products having improved qualities and improved moisture drainage rates. Improved moisture drainage rates allow for the formation of thicker interim wet lap products during process steps. This allows for formation of a thicker and more resilient leather substrate. The improved moisture drainage rates also allow for use of higher wet pressing pressures through process steps, which allow for improved fibril-to-fibril interactions to form an improved collagen fibril matrix. The improved fiber and fibril dispersion significantly contribute to the necessary fiber-to-fiber and fibril interactions to achieve improved physical properties in formed leather substrates.

In alternative process embodiments, the interim wet lap products may be treated directly with various processing aids to allow the formation of a leather substrate having desired physical properties.

Disclosed de-wetting and dispersion aids also allow the use of larger leather particles over old art methods. In disclosed process steps, source leather material may be shredded/ground and screened through apertures of up to 0.75 inches in diameter. These larger grind sizes allow accelerated processing times as well as preserve naturally occurring fiber-to-fiber interactions within leather material, allowing for formation of leather substrates having better tear resistance.

Leather products containing the collagen fibril matrix substrate have improved tensile strength qualities over known artificial and synthetic leathers. In tests by conventional tensometer, samples of leather substrate products are subjected to pulling stresses under tension to failure to determine maximum applied force measurements before failure. Measurements recorded and calculated as maximum tensile strength PSI ranged up to and over 6632 PSI, well above known artificial and synthetic leathers and many natural tanned leather samples.

Leather products containing the collagen fibril matrix substrate share the desirable physical characteristics of conventional leather and may be treated by mechanical enhancement techniques such as embossing, calendaring, staking, tumbling and so forth.

The disclosed processes allow for the formation of improved leather substrates having improved physical properties, including improved strength and tear resistance characteristics over prior-art leather substrates. In particular, a leather substrate formed according to the method disclosed herein may exhibit a tear resistance of greater than about 40 Newtons when tested in accordance with ASTM D 4704.

The disclosed processes also allow for improved processing of interim products mid-process over prior-art processes.

The disclosure also relates to the formation of a composite leather substrate that is formed from multiple leather substrates having different compositions. Creation of a composite leather substrate from two or more component sheets of leather material allows the use of source scrap leather that would otherwise be undesirable in a finished leather product. The composite leather substrate includes an outer, presentation surface having desired elastic properties for end applications including treatability with surface conditioning finishes and a high degree of smoothness.

The present disclosure further relates to the formation of a high-strength, tear-resistant multilayer composite leather substrate formed from multiple leather substrates.

The multilayer composite leather substrate incorporates leather substrate layers that do not contain process-interfering protective coating or agent residues in outer, presentation surfaces. Leather substrate layers formed from waste leather containing interfering residues are positioned as internal middle layers of the composite leather substrate.

Other features of the leather substrate will become apparent as the description proceeds, especially when taken in conjunction with the accompanying drawing sheets illustrating embodiments of the leather substrate and related method of manufacture.

DETAILED DESCRIPTION

Figure 1:
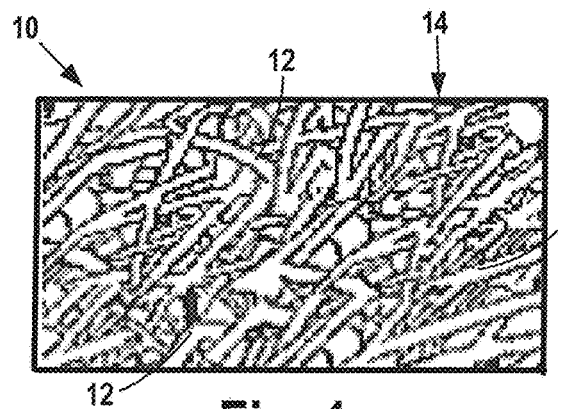
FIG. 1 is a cross-sectional view of prior-art conventional tanned leather.

FIG. 1 is a magnified cross-sectional view of conventional tanned leather 10. Leather 10 is made up by numerous elongate, entangled collagen fibers 12 that cooperate to form an open tanned leather matrix 14.

Figure 2:
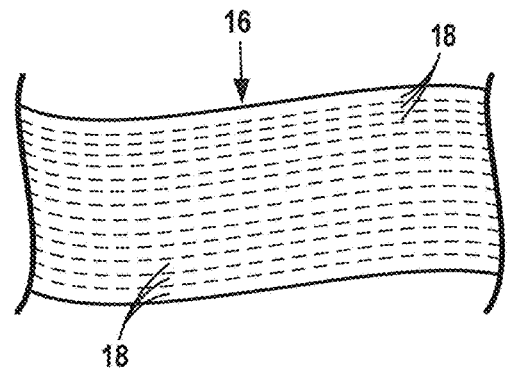
FIG. 2 is a cross-sectional view of a segment of a single collagen fiber bundle.
Figure 3:
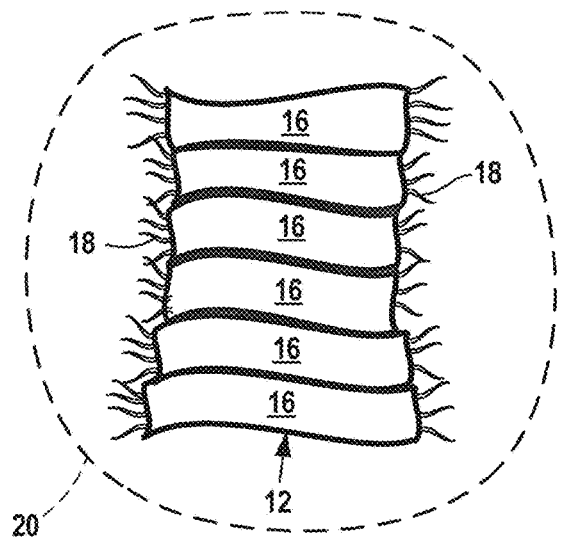
FIG. 3 is a view of a collection of fiber bundle segments found within a leather particle.
Figure 4:
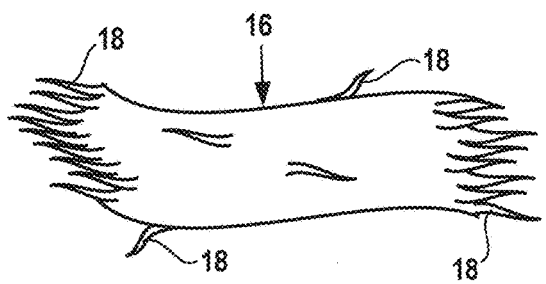
FIG. 4 illustrates a fiber bundle segment.

FIG. 2 is a cross-sectional representational view of a single collagen fibril bundle 16 segment made up of constituent elongated bundles of collagen fibrils 18. It is understood that FIG. 2 is a representational view and that in naturally occurring collagen fibril bundles, the constituent elongated bundles of collagen fibrils would not be aligned in uniform, parallel formation.

The disclosed leather substrate is formed from processing collected leather source material. Source material may be leather, leather scrap, leather byproducts or other forms of leather waste derived from conventional leather processing steps.

Collected leather source material is cut, ground or shredded into particles 20 of desired size containing leather material including fibril bundles 16.

In embodiments, source material leather or leather waste is cut or ground in machinery and screened through apertures varying in size from approximately 0.0625 inches to 0.75 inches in diameter to provide generally uniform leather particle pieces. Specific leather particles derived from source material may not necessarily be the same size or same size and shape.

In particular, the shredding or grinding may be accomplished through use of cutting machinery capable of cutting fibrous materials into finely controlled particle sizes. Potential cutters may be screen classifying cutters having multiple, staggered cutter blades that allow continuous, thorough shearing of leather waste. Cut particles are passed through a screen having screen apertures. These screen apertures vary in size from approximately 0.0625 inches to 0.75 inches in diameter to assure that collected particles are acceptable and likewise have specific and generally uniform size of about 0.0625 inches to 0.75 inches in diameter.

Potential cutting machinery may be a Munson brand "SCC" Screen Classifying Cutter Model No. SCC-15-SS, or like cutter.

Potential methods may include use of a Munson screen classifying cutter or like screen classifying cutter machinery that has a number of rotating cutting blades and stationary bed knives, wherein the distance between the rotating cutting blades and stationary bed knives can be adjusted. In such methods, in addition to use of a screen having screen apertures of about 0.0625 inches to 0.75 inches in diameter, the distance between the rotating cutting blades and stationary bed knives should be set to about 0.02 to 0.1 inches.

Potential cutting machinery may also be a rotary-knife mill capable of shredding source material leather or leather waste until the particles are small enough to drop through a screen having screen apertures of about 0.0625 inches to 0.75 inches in diameter.

Use of such a screen classifying cutter provides reliable formation of leather particles as a raw material for forming a leather substrate by the processes described generally in the present disclosure.

Formed waste leather particles may not necessarily all be of the same size. In particular, a percentage of particles may be generally spherical, having a diameter of anywhere between about 0.0625 inches to 0.75 inches in diameter. A percentage of particles may be less in size. Particles may also be elongate, having a cylindrical strand or thread-like structure with a major axis extending at lengths greater than 0.75 of an inch and with a cross sectional diameter of approximately 0.0625 inches to 0.75 inches in diameter.

Figure 5:
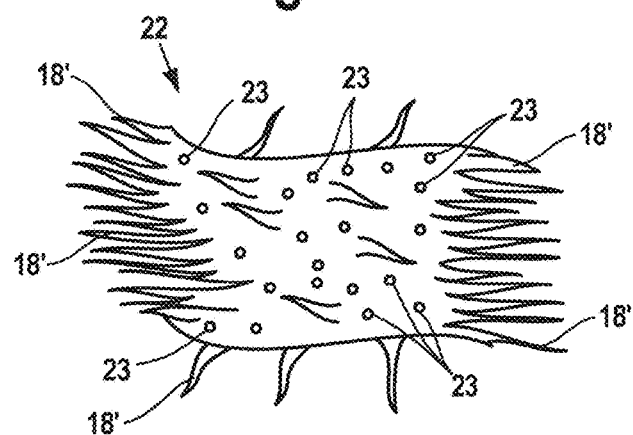
FIG. 5 illustrates a swollen fiber bundle segment.
Figure 6:
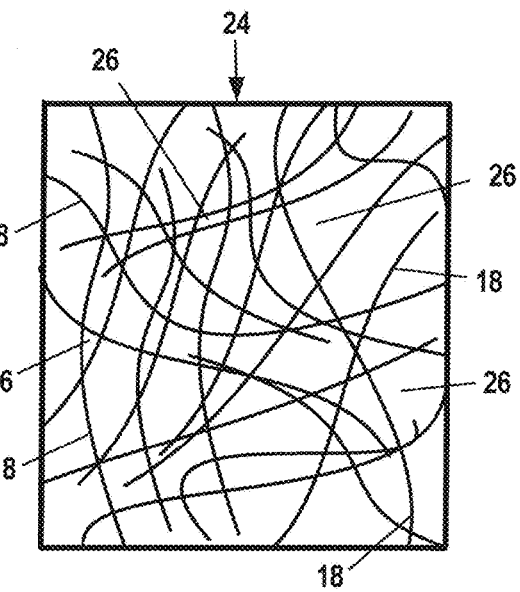
FIG. 6 illustrates a formed collagen fibril matrix.

Generated leather particles 20 of desired size, containing fibril bundles 16, are combined with a fluid, such as water, to form a particle/water mixture, also referred to as a leather/water particle mixture. Exposure to a fluid subjects fibril bundles 16 to fluid absorption, which distresses the bundles through swelling steps described below to form swollen fibril bundles 22. Swollen fibril bundles 22 contain quantities of absorbed fluid or water 23 that partially fibrillate the bonds between adjacent collagen fibrils 18. Distressed swollen fiber bundle segments 22 contain fibrillated constituent collagen fibrils 18' as shown in FIG. 5.

Fluid or water absorption likewise distresses and partially fibrillates the bonds between adjacent collagen fibers 12 in a particle 20.

Swollen fiber bundle segments 22 are subjected to physical mixing or agitation by mechanical dispersion devices. Potential dispersion devices may be refiners such as double disk refiners or conical refiners, as known in the paper manufacturing processes. Other potential dispersion devices may be beaters, as conventionally known in paper processing machinery, such as Hollander-type beaters. The physical mixing or agitation of the fiber bundle segments 22 extracts elongate constituent collagen fibrils 18. The collagen fibrils 18 are collected and processed to form collagen fibril matrix 24 as detailed below.

In disclosed process steps, the dispersion of individual collagen fibrils 18 from collagen fibril bundles 12 may be total or partial.

Total bundle dispersion results in the complete breakdown of bundles 12 into many constituent fibrils 18.

The use of the dewetting/dispersion aids as disclosed herein facilitates the creation of partially-dispersed collagen fibril bundles 12. These partially-dispersed collagen fibril bundles 12 may have selected fibrils dislodged from an intact bundle so that individual fibrils extend away from the intact bundle. These partially-dispersed fiber bundles have individual fibrils extending therefrom that may interact with individual fibrils extending from other fiber bundles to form a collagen fiber matrix 24 in process steps as detailed below.

A collagen fiber matrix 24 formed from such partially-dispersed fiber bundles may enjoy improved physical qualities over matrices formed entirely from totally-dispersed fiber bundles as the intact larger bundles confer a degree of natural leather's drape, tear resistance and other positive qualities to produced leather substrates. The collagen fibril matrix 24 is made up of a number of individual collagen fibrils 18 derived from collagen fiber bundles 12. Each collagen fibril 18 has an elongate body having a cross-sectional diameter generally less than 10 micrometers, and a length generally many times its diameter, each collagen fibril physically engaged and entangled with adjacent collagen fibrils to form collagen fibril matrix 24. Collagen fibril matrix 24 contains a plurality of fine gaps 26 between adjacent collagen fibrils 18 to form an overall open and porous matrix structure.

Methods of forming leather substrates having desirable physical characteristics and containing collagen fibril matrix 24 are described below.

Figure 7:
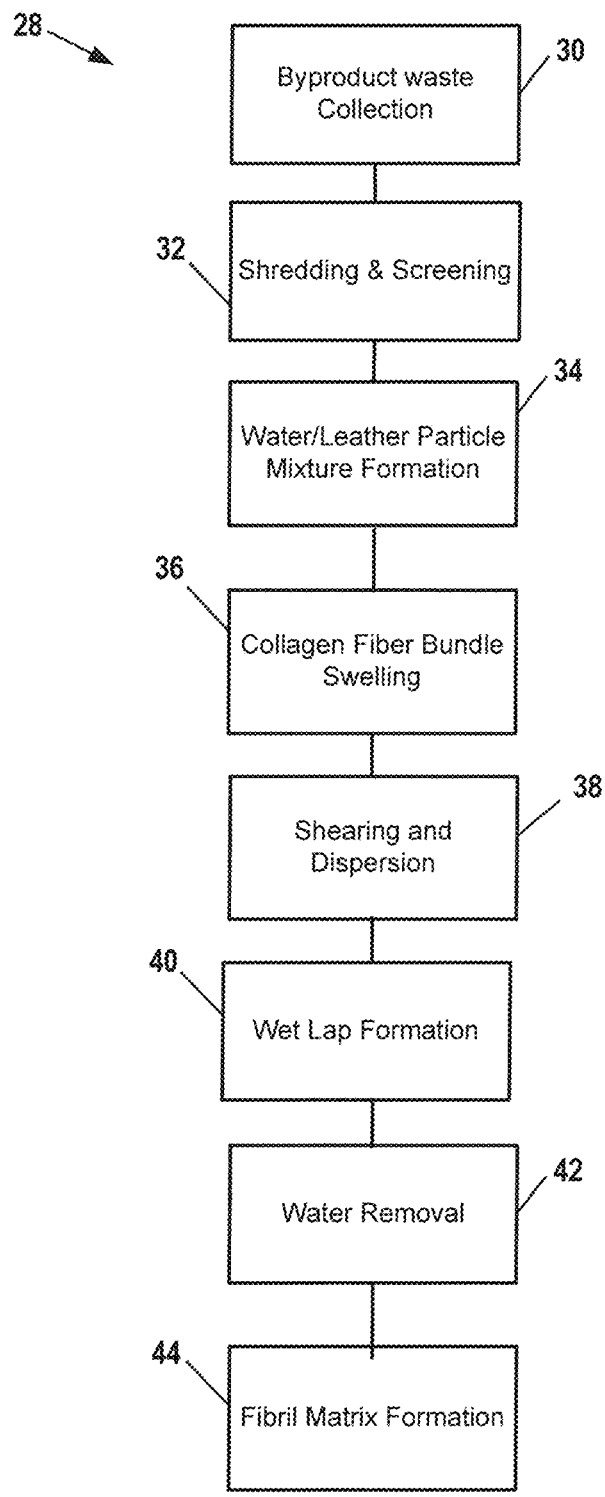
FIG. 7 is a flow chart illustrating steps in a method of forming a leather substrate.

The flowchart of FIG. 7 discloses a method 28 of producing a leather substrate containing the collagen fibril matrix from leather source material or like leather byproducts.

Starting at step 30, leather source material and/or byproduct waste is collected. Potential leather source material could be scrap leather waste byproducts produced in tanning processing steps or leather waste from articles manufacture from tanned leather.

At step 32, byproduct leather source material is shredded or ground and screened to form de-agglomerated byproduct particles 18 of a desired size. Particles are passed through a screen having screen apertures of a selected size to assure collected particles 18 are of a like selected size.

At step 34, collected particles 18 are mixed with a quantity of fluid or water to form a mixture. Typically, the particle/water mixture contains about 2% to 8% of leather particles 18 by weight.

Particles 20 become swelled with fluid or water from the particle/water mixture. While this mixture is referred to as a particle/water mixture herein, it is understood that fluid liquids other than water may be used.

Mixing at step 34 may be accomplished through use of known mechanical mixing equipment including pulpers, beaters, refiners, de-flakers or blenders.

The particle/water mixture formed at step 36 may also contain certain processing aids. These aids may be ionic salts, divalent cationic salts or combinations thereof, other processing or property modifiers, such as viscosity modifiers, alkali or acid materials to adjust pH or dyes, and pigments or bleaches to effect end-product color. Potential viscosity modifiers may include modified celluloses such as carboxy methyl cellulose and the like, polysaccharides such as pectin and various sugars, polyvinyl alcohol and polyacrylates.

In embodiments, the processing aids may be a polymer latex additive. In some examples, the ionic salts, divalent cationic salts or combinations thereof may be added to the water/leather particle mixture either before or after the addition of the polymer latex. Exemplary polymer latex additives may include an acrylic latex polymer such as acrylonitrile latex polymer. Suitable polymer latex additives may further include, but are not limited to, acrylonitrile-butadiene styrene (ABS), styrene-butadiene styrene, acrylonitrile-ethylene-butadiene-styrene, methyl methacrylate-butadiene styrene, polybutadiene, or styrene acrylonitrile latex polymers, among others. In some aspects, the polymer latex additive comprises about 50% polymer. Added salts may include salts of magnesium, strontium and calcium. In particular, added salts may include: magnesium chloride MgCl2 and hydrated forms thereof, calcium chloride CaCl2), magnesium sulfate Mg2SO4 and hydrated forms thereof, strontium chloride SrCl2, and hydrated forms thereof. Other salts may also be effective, not limited to the above listed divalent cationic salts, including: barium chloride BaCl2, iron(II) chloride FeCl2, magnesium bromide MgBr2, and magnesium iodide MgI2, for example. Ionic salts may be included so as to provide a water/leather particle mixture comprising up to about 25 wt. % of one or more ionic salts. In one example, the water/leather particle mixture comprises about 2% CaCl2 and 2.5% MgCl2.6H2O (magnesium chloride hexahydrate).

Particle swelling is a result of particle collagen fibril bundles absorbing water or fluid from the particle/water mixture to form swollen fibril bundle segments 22 at step 36. The swollen fibril bundle segments are partially distressed, causing partial separation of constituent fibrils which allows improved bundle dispersion in later processing steps.

At step 38, the particle/water mixture is sheared and dispersed by a dispersion device. The dispersion device subjects particles 20 within the particle/water mixture to shear forces that separate collagen fibrils 18 from particle collagen fibril bundles 16. The dispersion process shreds particles 20 and further distresses particle collagen fibril bundles to separate collagen fibrils 18 from particle collagen fibril bundles 12.

Potential dispersion devices may be refiners such as a double disk refiner or conical refiner, as are known in paper manufacturing processes. Other potential dispersion devices may be beaters as conventionally known in paper processing machinery, such as Hollander-type beaters.

The step 38 dispersion of the particle/water mixture is conducted for a period of time required to obtain desired fibril dispersion. A desired fibril dispersion may refer to non-agglomerated pieces or leather particles throughout the dispersion. To an observer, the fibril dispersion may appear substantially uniform. With too much mixing, individual leather fibers may begin to agglomerate. The desired fibril dispersion may have no or substantially no agglomerates of leather fiber, that is, there may be a generally even dispersion or distribution of leather fibrils. Substantially no agglomerates may refer to a few visible agglomerates.

In embodiments, at step 38 the dispersed particle/water mixture may be further diluted by water to a consistency of about 1% to 3% of leather particles 18 by-weight.

At step 40, water is removed from the particle/water mixture to form a substrate wet lap. Water is removed from the particle/water mixture so that the mixture can be formed or extracted into a substrate wet lap sheet or like structure that can be physically manipulated, and de-watered so that the wet lap sheet or structure is sufficiently strong for manipulation.

The formation of a substrate wet lap may be accomplished by transferring the water/leather particle mixture to forming equipment. Appropriate forming equipment could be commercial forming equipment, such as a Fourdrinier or cylinder-type machines typically used in specialty paper manufacturing.

In embodiments, the wet lap slurry may be transferred to a wire mesh section on the forming equipment. The water drains away from the wet lap slurry through the wire mesh by gravity to form the substrate wet lap.

Before draining, wet lap slurry leather content is typically in the range of about 0.5% to 3%. Wet lap slurry water content is typically about 97% to about 99.5%.

To form a wet lap, water is removed from the wet lap slurry. Wet lap water content is reduced to a range of about 40% to 90% by-weight. Wet lap leather content is thus increased to a range of about 10% to 60% by-weight.

Water is further removed from the substrate wet lap to form a leather substrate by steps known in conventional paper manufacturing using machinery to convert wet paper pulp to a dried paper product. For instance, draining of the particle/water mixture to form a substrate wet lap may be effected through use of a Fourdrinier-type machine having various pressing and drying operations, as explained in greater detail below.

At step 42, water is further removed from the substrate wet lap to form a leather substrate containing primarily by-weight of solids and a remainder by-weight of water. Step 42 may include subjecting the wet lap sheet to a wet pressing process, as generally known in paper manufacturing processes. Following wet pressing, the sheet may be further dried by conventional methods, such as heat drying, air drying and vacuum drying, to obtain an end leather substrate having a moisture content of about 2% to 8%.

As water is removed from the substrate wet lap, separated collagen fibrils 18 within the particle/water mixture physically interact with each other. As adjacent fibrils become physically engaged with each other, leather substrate collagen fibril matrix 24 is formed at step 44. Step 42 water removal may be effected through use of a Fourdrinier-type machine as explained in greater detail below.

Figure 8:
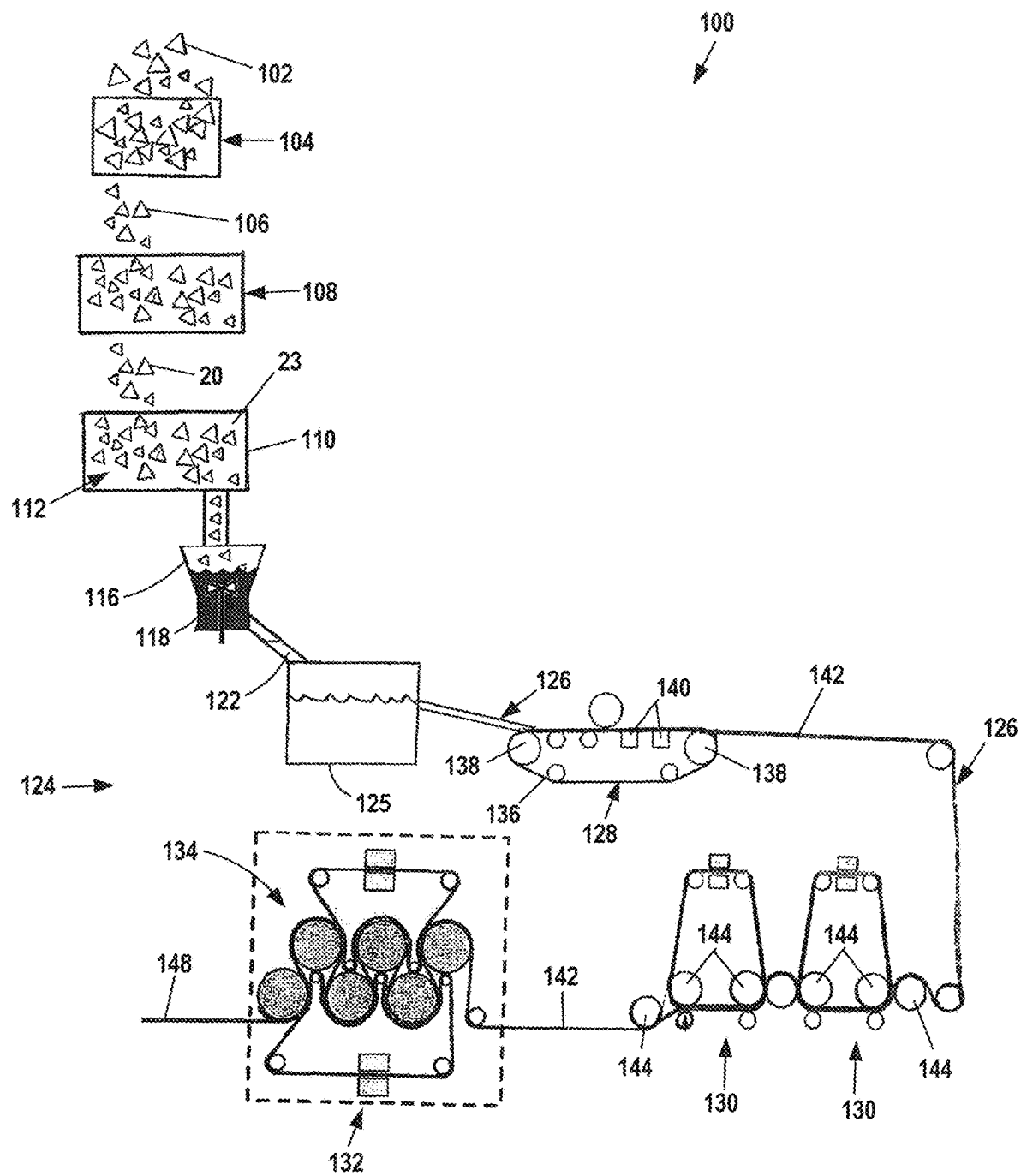
FIG. 8 illustrates an example apparatus for producing a leather substrate material.

FIG. 8 illustrates an apparatus 100 for producing a leather substrate in accordance with the steps shown in the FIG. 7 flowchart. Apparatus 100 may include elements commonly found in Fourdrinier-type paper processing machines.

In apparatus 100, waste leather 102 is selected and physically processed by shredding or grinding in shredder or grinder 104. Waste leather 102 is selected as described in step 30 of the FIG. 7 flowchart.

Initially collected waste leather 102 may come in the form of scraps from other leather tanning and treatment processes. Shredder or grinder 104 initially de-agglomerates shavings that may have become clumped due to water content or are compacted during bailing or other packaging methods. Shredder or grinder 104 also grinds larger particles to a desired size.

Physical processing by shredding or grinding forms initially shredded leather particles 106. Initially shredded leather particles 106 are screened through screening machine 108 to select leather particles 20 of a desired size and to screen out unwanted waste that may have passed through shredder 104, as described in step 32 above. Alternatively, a grinder may be used having an integrated screen to select processed leather particles having desired size criteria.

Leather particles 20 are next mixed with water 23 in a mixing chest or mixing tank 110 to form a water/leather particle mixture 112 containing a percentage of leather particles by-weight as described in step 34 above.

Leather particle collagen fibril bundles absorb water 23 from the particle/water mixture to form swollen fibril bundles 22 at step 38. Water/leather particle mixture 112 is delivered to a dispersion tank 116. Dispersion tank 116 includes a dispersion refiner 118, such as a double disk refiner, a conical refiner or Hollander-type beater, as is known in the paper manufacturing art.

Dispersion refiner 118 subjects leather particles 20 within mixture 112 to shear dispersion forces, as described in step 40 above.

Alternatively, water/leather particle mixture 112 may be separately delivered to a dispersion device and returned to mixing tank 110 for processing before drying steps are undertaken.

Water is separated from mixture 112 to form a wet lap slurry 122. Wet lap slurry 122 is transferred from dispersion tank 116 to processing machine 124 for de-watering, as described in step 40 above. Processing machine 124 may be a Fourdrinier-type machine typically used to make paper and paper products. Machine 124 has a head box 125 and a transfer assembly 126 including wire mesh section 128, one or more wet presses 130, dryer cans 132 and calendaring rollers 134.

Initially, wet lap slurry 122 is transferred to proceeding machine head box 125 and to wire mesh section 128 having wire mesh endless belt 136. Wire mesh endless belt 136 is made up of a wire meshing or dewatering or forming wires that allow initial draining of wet lap slurry 122 to form a wet lap 142. Belt 136 is driven by rollers 138. Vacuums 140 may be used to assist in de-watering wet lap slurry 122.

As indicated, de-watering by wire mesh section 128 sufficiently de-waters wet lap slurry 122 to form wet lap 142 that first forms on wire mesh section 128. Wet lap 142 is transferred further along transfer assembly 126 from wire mesh section 128 to one or more wet presses 130 for additional mechanical de-watering by presses 144.

Wet lap 142 is further transferred along assembly 126 from wet presses 130 to drier section 132 for final de-watering by drying. Drier section 132 may include a heated felt dryer, as known in the paper making art.

At this point in the process, wet lap 142 has been sufficiently de-watered to form a leather substrate 148 having desired moisture content and containing a collagen fibril matrix 24, as described in steps 42 and 44 above.

In disclosed process steps, the particle/water mixture may be treated with various materials as described in the above-referenced priority applications. In particular, specific de-wetting/dispersion aids may be added at different steps of the disclosed process.

In embodiments, the de-wetting/dispersion aids may be added to dry leather particles at an initial agitation step the process. In alternative embodiments, de-wetting/dispersion aids may be added to the particle/water mixture at a mixing step of the process. In other embodiments, the de-wetting aids may be added at multiple steps of the process, for instance at both the initial agitation step and at a later particle/water mixing step.

The de-wetting/dispersion aids may be selected types of oils.

De-wetting/dispersion aids having low water solubility and high collagen fiber affinity are effective in achieving desired de-wetting/dispersion results.

In embodiments, selected oils are organic chemicals with more than 5 carbon atoms. Oils may have from 8 to 15 carbons and are liquids at room temperature. Oils may be a wide range of types containing other atomic components, such as oxygen and others, and may come from the groups including, but not limited to alcohols, aldehydes, ethers, esters, and the like. In particular, terpenes are effective oils for this purpose. Typically, these oils have molecular weights in the range of 72 grams/mole to 400 grams/mole. In addition, materials which have a higher molecular weight or materials within this molecular weight range, which are solids at room temperature, can also be effective if they are combined with materials above, which are liquids at room temperature. For example, (2R,3S,4S,5R,6R)-2-(hydroxymethyl)-6-[(E)-3-phenylprop-2-enoxy]oxane-3,4,5-triol (gum rosin) and hexadecanol, which are both solids at room temperatures, have been found to be effective.

Potential de-wetting/dispersion aids may include:
Limonene
Pinene
Menthol
Myrcene
Citral
Linalool
Farnecene
Caryophyllene
Phytol
Squalene
Nonanol
Deanol
Octanol
Benzyl alcohol
Oleyl alcohol
2-octyl-1-dodecanol
Decanal
Nonanal
Octanal
Hexadecanol
Tetradecanol
Octadecanol
Undecanol
Dodecanol
Colophony (gum rosin)

The above list identifies potential de-wetting/dispersion aids and is not intended to be limiting in nature.

De-wetting/dispersion aids may be added to the leather waste before later processing steps. Referring to the flowchart of FIG. 7, in embodiments the de-wetting/dispersion aids may be added to collected leather waste at process step 30.

After collection step 30, leather waste is physically processed by cutting, shredding or grinding to create de-agglomerated leather particles 18. These particles are screened, as generally described in step 32.

De-wetting/dispersion aids may also be added as leather particles 18 are formed in the shredding or grinding steps. In embodiments, the de-wetting/dispersion aids are added to the leather waste within grinder or shredder 104 at process step 32.

The de-wetting/dispersion aids may be added in proportion to the leather waste at various ratios at steps 30 or 32. In embodiments, the by-weight ratio of leather waste to a selected wetting/dispersion may be 30-to-1. In embodiments, the by-weight ratio of leather waste to a selected wetting/dispersion may be 1-to-1. In other embodiments, by-weight ratio of leather waste to a selected wetting/dispersion may vary between 30-to-1 and 1-to-1.

In another embodiment of the disclosed method, de-wetting/dispersion aids are added to the particle/water mixture at disclosed step 34. The de-wetting/dispersion aids added at step 34 may be certain classes of selected oils and may be identical to the de-wetting/dispersion aids described above.

In the particle/water mixture, the by-weight ratio of leather particles to a selected de-wetting/dispersion aid should be a minimum of 1 part of the leather particles to 0.016 of the aid. In embodiments, the by-weight ratio of leather particles to a selected aid can be 1 part of the leather particles to 0.03 of the aid. In preferred embodiments, the by-weight ratio of leather particles to a selected aid can be 1 to X, where X is greater than 0.03.

A specific advantage of the disclosed process is the rate and amount of water which can be removed over initial formation of the wet lap at step 40 as well as later wet pressing steps at step 42 while maintaining good formation of a wet lap from wet lap slurry. This allows formation of wet lap having uniform and well-distributed leather fiber orientation.

For example, in method steps including the use of paper processing machinery (specifically a Fourdrinier-type paper machine), wet lap slurry may be transferred to a wire mesh endless belt or like apparatus to form a wet lap sheet, as described above.

The wet lap sheet retains an amount of water as it traverses along the wire mesh endless belt. This quantity of water allows leather solids within the sheet to move relative to one another to some degree, which can harm the formation of stable fiber-to-fiber and fibril-to-fibril interactions needed to create a strong leather substrate.

Through draining, the wet lap sheet loses water until a visible wet line/dry line on the wet lap sheet is formed. Once this water is removed from the wet lap sheet, the stability of the leather solids and formed fiber-to-fiber and fibril-to-fibril interactions is greatly increased.

The improved moisture drainage rate achieved through the use of de-wetting/dispersion aids allows for water to drain more quickly from the wet lap sheet. This improved draining causes the wet line/dry line on the wet lap sheet to manifest closer to point of initial wet lap slurry placement, conventionally the paper machine head box. The improved draining reduces the amount of time that wet lap slurry traverses along the wire in an undesirably wet, unstable state, thus allowing formation of a stronger leather substrate.

Prior art methods for forming substrates having poorer drainage rates results in longer wet lap slurry traversal times and therefore more opportunity for leather solids within the sheet to move relative to one another that can disrupt the formation of collagen fiber-to-fiber interactions needed to form a stronger leather substrate.

The disclosed process decreases the amount of time to drain wet lap slurry water/moisture content through process steps. Water drainage rate is improved by about two-thirds over prior art methods.

For example, within a laboratory setting, in forming a substrate wet lap sheet for formation of a finished leather substrate having a thickness of 1.5 mm, the time for water to drain from the sheet through use of prior art methods is typically 30 seconds or more. Using the disclosed process, the drainage time is less than 30 seconds and may be less than 10 seconds.

The improved drainage rate allows formation of thicker wet lap sheets over prior art processes and thus, thicker end products with improved durability and workability.

The disclosed process also allows formation of a wet lap having improved leather fiber-to-leather fiber interaction to provide improved physical properties over wet lap formed by prior art methods. The improved physical properties include improved tear resistance and tensile strength over prior art methods.

Following the forming process, the wet lap sheet may be subjected to a wet pressing process at above described step 42.

In prior art methods, the amount of pressure that can be used through the wet pressing process is limited to avoid adverse disruption of the fiber orientation and interaction between leather particles. Through the use of the disclosed process, higher pressures can be used without such adverse disruption or crushing of collagen fibril matrices within the substrate.

Figure 9:
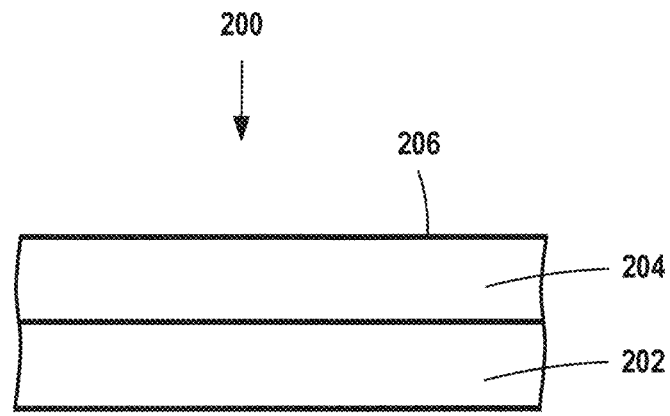
FIG. 9 is a cross-sectional view of a composite leather substrate.

A cross-sectional representational view of disclosed composite leather substrate 200 is shown in FIG. 9.

Composite leather substrate 200 is formed from two leather substrates 202 and 204.

Leather substrate 202 may be a leather substrate 148, as described above, formed from process 28 utilizing waste leather 102 having the residue of protective coatings, processing agents or other substances that interfere with the steps of properly processing leather particles through the process, resulting in creation of an imperfect leather substrate having lumps or other undesirable features.

Leather substrate 204 may be a leather substrate 148, as described above, formed from process 28 utilizing waste leather 102 that is free from substances that interfere with the steps of properly executing the formation process, resulting in creation of leather substrate having a smooth, lump-free presentation surface 206.

Leather substrates 204 and 206 may be produced in parallel operating apparatuses 100, each apparatus being fed with a different waste leather 102.

In operation, each apparatus 100 would generate an interim wet lap sheet 124. The sheets from each apparatus are combined together to form a composite leather substrate 206 having an outwardly facing presentation surface 206.

The combination of the sheets may be completed prior to wet pressing at method step 42.

Figure 10:
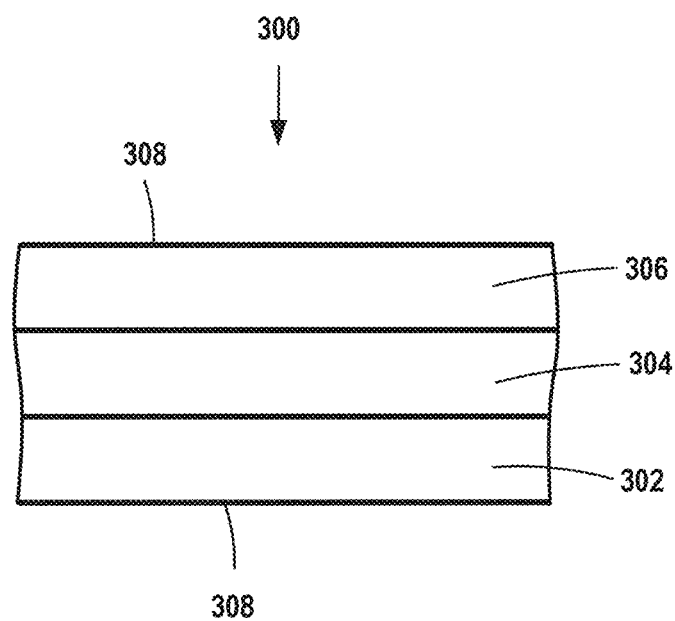
FIG. 10 is a cross-sectional view of an alternate embodiment composite leather substrate.

A cross-sectional representational view of an alternate embodiment composite leather substrate 300 is shown in FIG. 10.

Composite leather substrate 300 is formed from leather substrates 302, 304 and 306.

Leather substrate 304 may be a leather substrate 148, as described above, formed from process 28 utilizing waste leather 102 having the residue of protective coatings, processing agents or other substances that interfere with the steps of properly processing leather particles through the process, resulting in creation of an imperfect leather substrate having lumps or other undesirable features.

Leather substrate 304 is sandwiched between leather substrates 302 and 306 having outwardly facing presentation surfaces 308.

Leather substrates 302 and 306 may be leather substrates 148, as described above, formed from process 28 utilizing waste leather 102 that is free from substances that interfere with the steps of properly executing the formation process, resulting in creation of a leather substrate having a smooth, lump-free presentation surface 308.

In further alternate embodiments, a composite leather substrate may be formed from more than three leather substrates.

Further methods of forming leather substrates having desirable physical characteristics and containing a collagen fibril matrix are described below.

Figure 11:
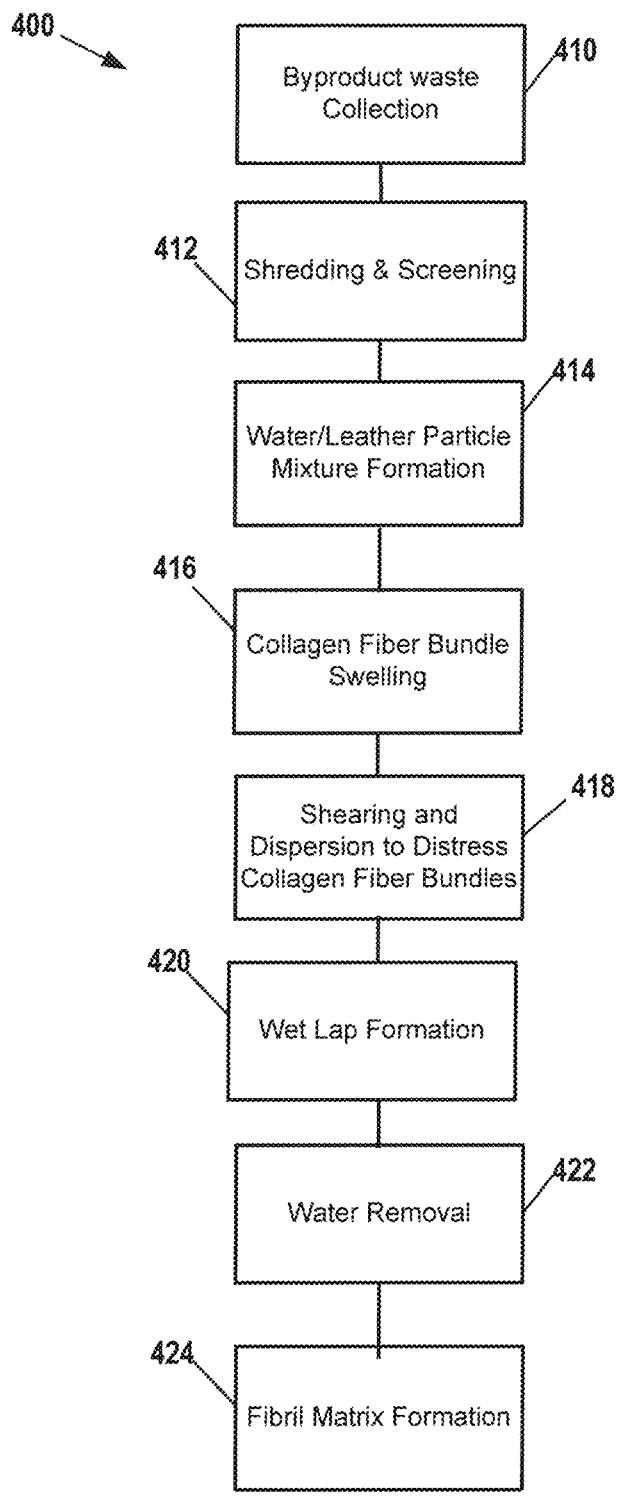
FIG. 11 is a flow chart illustrating steps in an alternative method of forming a leather substrate.

The flowchart of FIG. 11 discloses an alternate method 400 of producing a leather substrate containing the collagen fibril matrix from leather source material or like leather byproducts.

Starting at step 410, leather source material and/or byproduct waste is collected, like step 30 disclosed above.

At step 412, byproduct leather source material is shredded or ground and screened to form de-agglomerated byproduct particles 18 of a desired size, like step 32 disclosed above.

At step 414, collected particles 18 are mixed with a quantity of fluid or water to form a mixture, like step 34 disclosed above.

At step 416, collagen fibril bundles absorbing water or fluid from the particle/water mixture to form swollen fibril bundle segments 22, as disclosed in step 36 above. The swollen fibril bundle segments are partially distressed, causing partial separation of constituent fibrils.

At step 418, the particle/water mixture is sheared and dispersed by a dispersion device. The dispersion device subjects particles 20 within the particle/water mixture to shear forces to distress particle distress collagen fiber bundles to a degree to encourage the formation of further distressed fiber bundle segments 22 having partially-fibrillated constituent collagen fibrils 18'.

Potential dispersion devices may be refiners such as a double disk refiner or conical refiner, as are known in paper manufacturing processes. Other potential dispersion devices may be beaters as conventionally known in paper processing machinery, such as Hollander-type beaters, as disclosed in step 38 above.

The step 418 dispersion of the particle/water mixture is conducted for a period of time required to obtain desired distressed fiber bundle segments 22. A desired fibril dispersion may refer to non-agglomerated pieces or leather particles throughout the dispersion having partially distressed fiber bundle segments 22 having partially-fibrillated constituent collagen fibrils 18'. Partially-fibrillated constituent collagen fibrils 18' extending from a base fiber bundle segments 22 may have the appearance of individual hairs extending from the bundle segments, creating the appearance of a "harry" bundle segment 22.

In embodiments of method 400, the step 418 dispersion of the particle/water mixture is conducted in a manner and over a period of time to obtain a mixture of generally uniform consistency that contains a majority of larger collagen fiber bundle segments 22 over smaller constituent collagen fibrils 18.

At step 420, water is removed from the particle/water mixture to form a substrate wet lap, like step 40 disclosed above.

At step 422, water is further removed from the particle/water mixture, like step 42 disclosed above.

Figure 12:
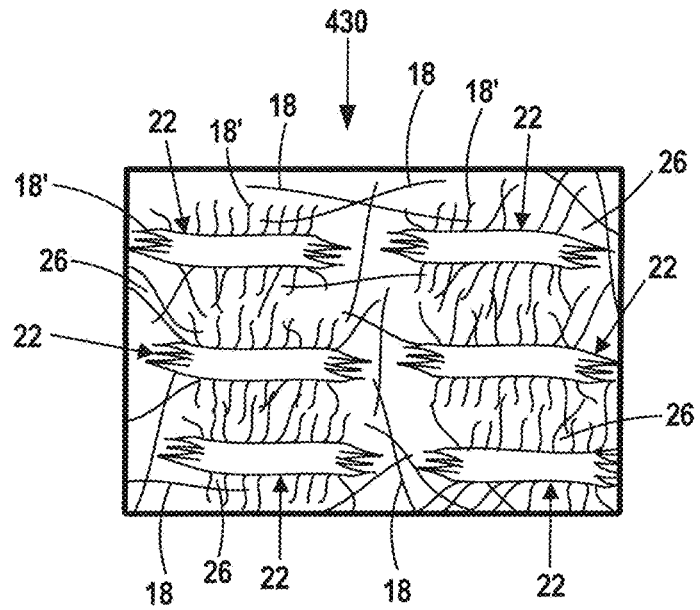
FIG. 12 illustrates an alternate embodiment collagen fibril matrix.

At step 424, as water is further removed from the substrate wet lap to form a leather substrate collagen fibril matrix 430 as show in FIG. 12. As water is removed from the substrate wet lap, separated bundle segment 22 particle/water mixture physically interact with each other. As fibrils 18' on adjacent bundle segments 22 become physically engaged with each other, leather substrate collagen fibril matrix 430 is formed.

In embodiments, leather substrate collagen fibril matrix 430 may also contain a quantity of independent collagen fibrils that were dispersed from bundle segments 22 in prior processing steps. Such collagen fibrils 18 may form part of collagen fibril matrix 430, interacting with other collagen fibrils 18 and/or with fibrils 18' on an undispersed bundle segment 22.

Collagen fibril matrix 430 contains a plurality of fine gaps 26 between adjacent collagen fibrils 18 to form an overall open and porous matrix structure, generally similar to matrix 24.

Figure 13:
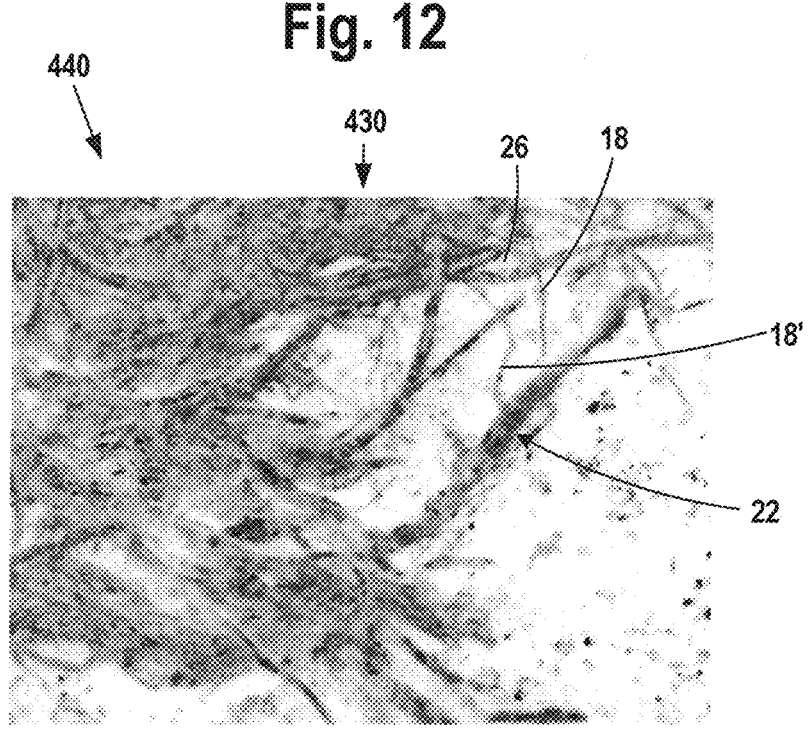
FIG. 13 is a micrograph image of an alternate embodiment leather substrate.

FIG. 13 is a micrograph image showing a leather substrate 440 formed by method 400 having a collagen fibril matrix 430 formed from intersecting and entangled bundle segments 22, fully dispersed collagen fibrils 18 and partially dispersed collagen fibrils 18'.

The collagen material in leather substrate 440 may be made up of a majority of larger entangled bundle segments 22 over smaller fully dispersed collagen fibrils 18 and partially dispersed collagen fibrils 18'. In embodiments, the collagen material in leather substrate 440 may be made up of at least 50% by weight of entangled bundle segments 22. The production of a leather substrate 440 having a majority of larger entangled bundle segments 22 allows substrate 440 to better emulate the physical characteristics of naturally-occurring leather having entangled collagen fibers as shown in FIG. 1.

Leather substrate 440 may contain certain amounts of the substances added to the leather particle/water mixture provided in steps 414 and 416 of method 400 as described herein. Substances may include amounts of fluid or water 23, salts, de-wetting/dispersion aids, polymers, viscosity modifiers and other processing aids as broadly described herein.

These substances are located within the collagen fibril matrix 24, within gaps 26, in contact with the collagen material and/or absorbed by the collagen material.

In embodiments, the salts contained within leather substrate 440 may include the salts described in method 28 herein. In particular embodiments, salts include ionic salts, divalent cationic salts or combinations of ionic salts and divalent cationic salts. Cationic salts may be cationic salts of magnesium, strontium and calcium such as magnesium chloride MgCl2, calcium chloride CaCl2), magnesium sulfate Mg2SO4 and strontium chloride SrCl2.

In embodiments, the de-wetting/dispersion aids contained within leather substrate 440 may include the de-wetting/dispersion aids described in method 28 herein. In particular embodiments, de-wetting/dispersion aids include selected types of oils, having molecular weights in the range of 72 grams/mole to 400 grams/mole.

In embodiments, the polymers contained within leather substrate 440 may include the polymers described in method 28 herein. In particular embodiments, polymers may include latex polymers such as acrylic latex polymers, acrylonitrile latex polymers or combinations thereof. Polymers may also be acrylonitrile-butadiene styrene (ABS) polymers, styrene-butadiene styrene polymers, acrylonitrile-ethylene-butadiene-styrene polymers, methyl methacrylate-butadiene styrene polymers, polybutadiene polymers, or styrene acrylonitrile latex polymers.

In embodiments, the viscosity modifiers contained within leather substrate 440 may include the viscosity modifiers described in method 28 herein. In particular embodiments, viscosity modifiers may be modified celluloses such as carboxy methyl cellulose and/or other cellulose derivatives, polyvinyl alcohol and/or other water-soluble synthetic polymers, polyacrylates, crosslinked polyacrylates and/or other acrylate polymers as well as polysaccharides such as pectin and various sugars and carbohydrates.

In embodiments, the additional processing aids 160 contained within leather substrate 440 may include substances in addition to the above including alkali or acidic materials, pigments and bleaches.

In embodiments, leather substrate 440 may contain between 60% to 80% collagen material by-weight, between 0.01% to 5% salts by-weight, between 0.5% to 10% de-wetting/dispersion aids by-weight, between 15% to 35% polymers by-weight, between 0.5% to 8% viscosity modifiers by-weight and between 6% to 15% fluid or water by weight.

In embodiments collagen material within leather substrate 440 may absorb some portion of applied polymer material, so that a portion of polymer material is located within given fibril bundles 22 and/or collagen fibrils 18.

A leather substrate 440 formed by method 400 may have desirable physical characteristics, including improved tensile strength and tear-resistance characteristics. Additional desirable physical characteristics of leather substrate 440 may include a uniform physical consistency and responsiveness to traditional leather treatments.

Figure 14:
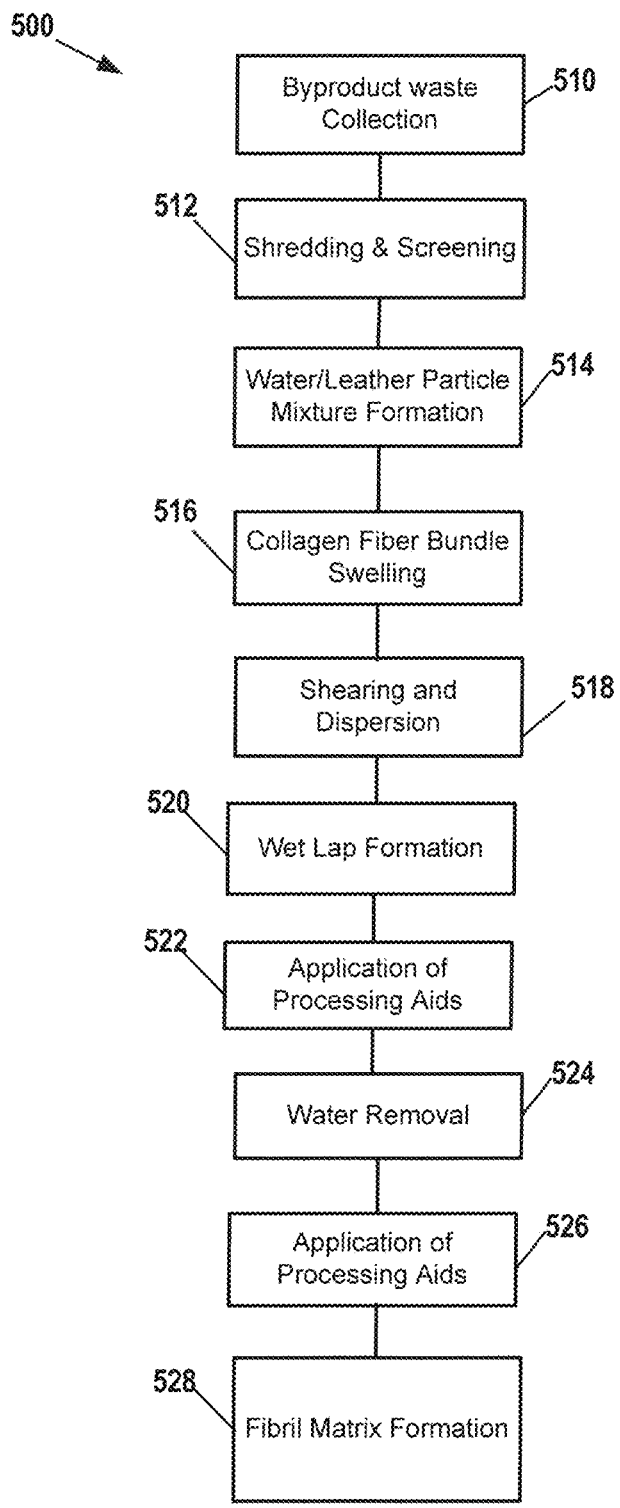
FIG. 14 is a flow chart illustrating steps in a further alternative method of forming a leather substrate.

The flowchart of FIG. 14 discloses a further alternate method 500 of producing a leather substrate containing the collagen fibril matrix from leather source material or like leather byproducts.

In particular, method 500 discloses the treatment of the interim wet lap products by selected additives. that cannot be effectively added to the particle/water mixture used in earlier process steps.

At step 510, leather source material and/or byproduct waste is collected, like steps 30, 410 disclosed above.

At step 512, byproduct leather source material is shredded or ground and screened to form de-agglomerated byproduct particles 18 of a desired size, like steps 32, 412 disclosed above.

At step 514, collected particles 18 are mixed with a quantity of fluid or water to form a mixture, like steps 34, 414 disclosed above.

At step 516, collagen fibril bundles absorb water or fluid from the particle/water mixture to form swollen fibril bundle segments 22, as disclosed in steps 36, 416 above.

At step 518, the particle/water mixture is sheared and dispersed by a dispersion device to a desired degree. The particle/water mixture is sheared and dispersed by a dispersion device to obtain fully dispersed fiber bundle segments 22 to constituent collagen fibrils and/or partially distressed fiber bundle segments 22 having partially-fibrillated constituent collagen fibrils 18' as disclosed in steps 38 or 418 above.

At step 520, water is removed from the particle/water mixture to form a substrate wet lap, like steps 40, 420 disclosed above.

At step 522, one or more processing aids are applied to the substrate wet lap.

In embodiments, processing aids may include polymers, including latex polymers, polyurethane polymers and acrylic polymers. These processing aids may act to improve the durability of a final leather substrate product.

In alternate embodiments, processing aids may include selected fat liquors, including emulsions of soaps and fat or sulfonated oils used leather tanning applications as well as leather softening and conditioning agents. These processing aids may act to improve the feel, drape and wearability of a final leather substrate product.

In alternate embodiments, processing aids may include plasticizers, including butyl benzyl phthalate (BBzP) and other known plasticizers. These processing aids may act to improve the durability as well as the feel, drape and wearability of a final leather substrate product.

In alternate embodiments, processing aids may include water proofing agents, including silicone-based sealant agents or petroleum-based sealant agents. These processing aids may act to improve the water-resistance of a final leather substrate product.

In alternate embodiments, processing aids may include pigments and dyes as known in the leather processing art. These processing aids may act to improve the color and appearance of a final leather substrate product.

In alternate embodiments, processing aids may include static control agents. These processing aids may act to reduce or eliminate buildup of static electricity in a final leather substrate product.

In alternate embodiments, processing aids may include fire retardants that may act to improve fire-resistant qualities in a final leather substrate product.

At step 522, the processing aids may be applied to the wet lap in different ways. The wet lap may be subjected to a bath submersion of a selected processing aid, a spray treatment of a selected processing aid and/or a treatment by overlaying or underlying coater or roller application of a selected processing aid.

A specific processing aid may be applied to the wet lap to obtain a final leather substrate product having physical characteristics as described generally above.

In embodiments, more than one processing aid may be applied to the wet lap to obtain a final leather substrate having a number of desired physical characteristics.

At step 524, water is further removed from the particle/water mixture, like steps 42, 422 disclosed above. As indicated, step 524 may include subjecting the wet lap sheet to a wet pressing process, or other drying methods, such as heat drying, air drying and vacuum drying.

After step 524, but before drying and formation of a final leather substrate having a suitable collagen fibril matrix at step 528, additional processing aids may be applied to the wet lap at step 526. Processing aids applied at step 526 may be selected from the group of processing aids described in step 522 above.

Further describing method 500, and referring to application FIG. 8, processing aids may be applied to a wet lap at any point on apparatus 100 after the wet lap is transferred downstream from machine head box 125 to a machine dewatering or forming wire 128 of transfer assembly 126.

In embodiments, processing aids may be applied to a wet lap 142 at different locations along apparatus 100.

In embodiments, processing aids may be sprayed onto wet lap 142 at wire mesh section 128 endless wire belt 136.

In embodiments, after wet lap 142 is transferred downstream from wire mesh section 128 along transfer assembly 126, wet lap 142 may be further sprayed and/or subjected to a bath submersion of selected processing aids.

In embodiments, after wet lap 142 is transferred along assembly 126 to wet presses 130, wet lap 142 may be further sprayed and/or subjected to a bath submersion of selected processing aids.

In embodiments, as wet lap 142 is transferred along assembly 126 to drier section 132, wet lap 142 may be further sprayed by a processing aids and/or subjected to surface application of a processing aids by an overlaying or underlying coater or roller application.

Method 500 allows the formation of a leather substrate having desirable characteristics depending on the selected processing aids.

While this disclosure includes one or more illustrative embodiments described in detail, it is understood that each of the one or more embodiments is capable of modification and that the scope of this disclosure is not limited to the precise details set forth herein but include such modifications that would be obvious to a person of ordinary skill in the relevant art, as well as such changes and alterations that fall within the purview of the following claims.

What is claimed is:

1. A method of forming a leather substrate material comprising the steps of:
    (a) collecting leather material;
    (b) shredding and screening the leather material to provide leather material particles comprising collagen fiber bundles;
    (c) combining the leather material particles with a portion of a fluid or water to provide a water/leather material particle solution or a fluid/leather material particle solution;
    (d) allowing collagen fiber bundles of the leather material particles to absorb at least a portion of the fluid or water;
    (e) shearing the leather material particles;
    (f) dispersing the leather material particles;
    (g) forming a wet lap or pulp comprising the leather material particles from the water/leather material particle solution or fluid/leather material particle solution;
    (h) applying a processing aid to the wet lap or pulp; and,
    (g) removing least a portion of the fluid or water from the wet lap or pulp to form a leather substrate.

2. The method of claim 1 wherein the processing aid is a polymer.

3. The method of claim 2 wherein the polymer is selected form the group of latex polymers, polyurethane polymers or acrylic polymers.

4. The method of claim 1 wherein the processing aid is a fat liquor.

5. The method of claim 1 wherein the processing aid is a plasticizer.

6. The method of claim 5 wherein the plasticizer is butyl benzyl phthalate.

7. The method of claim 1 wherein the processing aid is a water proofing agent.

8. The method of claim 7 wherein the water proofing agent is a silicone-based sealant.

9. The method of claim 1 wherein the processing aid is a pigment or dye.

10. The method of claim 1 wherein the processing aid is a static control agent.

11. The method of claim 1 wherein the processing aid is a fire retardant.

12. The method of claim 1 wherein step (h) comprises spraying the processing aid onto the wet lap or pulp.

13. The method of claim 1 wherein step (h) comprises submerging the wet lap or pulp in a bath of the processing aid.

14. The method of claim 1 wherein step (h) comprises applying the processing aid to a surface of the wet lap.

15. The method of claim 14 wherein step the processing aid is applied to a surface of the wet lap by a roller.

16. The method of claim 1 wherein step (h) comprises applying a second processing aid to the wet lap or pulp.

17. A method of forming a leather substrate material comprising the steps of:
(a) providing leather particles from a leather source, said leather particles comprising collagen fiber bundles;
(b) combining the leather material particles with a fluid or water to form a leather material solution;
(c) agitating the leather material solution;
(d) removing at least a portion of the fluid from the leather material solution to form a wet lap or pulp;
(e) applying a processing aid to the wet lap or pulp; and,
(f) removing least a portion of the fluid or water from the wet lap or pulp to form a leather substrate.

18. The method of claim 17 wherein the processing aid is a polymer.

19. The method of claim 17 wherein the processing aid is a fat liquor.

20. The method of claim 17 wherein the processing aid is a plasticizer.

21. The method of claim 17 wherein the processing aid is a water proofing agent.

22. The method of claim 17 wherein the processing aid is a pigment or dye.

23. The method of claim 17 wherein the processing aid is a static control agent.

24. The method of claim 17 wherein the processing aid is a fire retardant.

25. The method of claim 17 wherein step (e) comprises spraying the processing aid onto the wet lap or pulp.

26. The method of claim 17 wherein step (e) comprises submerging the wet lap or pulp in a bath of the processing aid.

27. The method of claim 1 wherein step (e) comprises applying a second processing aid to the wet lap or pulp.

28. A leather substrate material formed by a process comprising:
(a) providing leather particles from a leather source, said leather particles comprising collagen fiber bundles;
(b) combining the leather material particles with a fluid to form a leather material solution;
(c) allowing said collagen fiber bundles of the leather particles to absorb at least a portion of said fluid or water;
(d) forming a wet lap or pulp comprising said leather particles; and
(e) applying a processing aid to the wet lap or pulp.

29. The leather substrate material of claim 28 wherein the processing aid is a polymer.

30. The leather substrate material of claim 28 wherein the processing aid is a fat liquor.

31. The leather substrate material of claim 28 wherein the processing aid is a plasticizer.

32. The leather substrate material of claim 28 wherein the processing aid is a water proofing agent.

33. The leather substrate material of claim 28 wherein the processing aid is a pigment or dye.

34. The leather substrate material of claim 28 wherein the processing aid is a static control agent.

35. The leather substrate material of claim 28 wherein the processing aid is a fire retardant.

36. The leather substrate material of claim 28 wherein step (e) comprises spraying the processing aid onto the wet lap or pulp.

37. The leather substrate material of claim 28 wherein step (e) comprises submerging the wet lap or pulp in a bath of the processing aid.

38. The leather substrate material of claim 28 wherein step (e) comprises applying a second processing aid to the wet lap or pulp.

* * * * *